United States Patent [19]

Huntley

[11] 4,238,669
[45] Dec. 9, 1980

[54] OVEN HAVING DUAL HEATING MEANS

[76] Inventor: James H. Huntley, 5207 Columbus Ave., Sandusky, Ohio 44870

[21] Appl. No.: 892,738

[22] Filed: Apr. 3, 1978

[51] Int. Cl.³ .............................................. H05B 1/02
[52] U.S. Cl. ................................. 219/405; 219/391; 219/398; 219/413; 219/411; 426/236
[58] Field of Search ............... 219/354, 391, 396–399, 219/405, 411, 412–414; 426/236

[56] References Cited

U.S. PATENT DOCUMENTS

| 1,392,802 | 10/1921 | Serrel | 219/399 |
| 2,668,221 | 2/1954 | McCormick | 219/398 |
| 3,244,859 | 4/1966 | Whiteford | 219/398 |
| 3,265,861 | 8/1966 | Perlman | 219/399 |
| 3,487,198 | 12/1969 | Sloan | 219/397 |
| 3,515,854 | 6/1970 | Williams | 219/388 |
| 3,548,153 | 12/1970 | Kells | 219/397 |
| 3,626,155 | 12/1971 | Joeckel | 219/398 |
| 3,655,942 | 4/1972 | Tomsic | 219/399 |
| 3,682,643 | 8/1972 | Foster | 219/405 |

Primary Examiner—C. L. Albritton
Assistant Examiner—Bernard Roskoski
Attorney, Agent, or Firm—Squire, Sanders & Dempsey

[57] ABSTRACT

An oven is disclosed adapted to heat a food item of the type having a crust portion and a filler portion lying on the crust portion, characterized in that a first electrical heating member, adapted for substantially constant heating operation at a predetermined temperature, is stationed in the oven adjacent the crust portion, and a second heating member, having a greater thermal intensity than the first heating means and adapted for substantially brief heating operation at a temperature higher than the predetermined temperature, is stationed in the oven adjacent the filler portion.

4 Claims, 5 Drawing Figures

OVEN HAVING DUAL HEATING MEANS

BACKGROUND OF THE INVENTION

Ovens are commonly used to cook or bake food items for consumption. Proper preparation of the food during which all portions are properly heated is a frequent problem. For example, some portions may be properly heated while still other portions are underheated or, conversely, overheated and even scorched.

This problem exists with the preparation of all food items, but is particularly accentuated in the case of food items which by their nature have different portions requiring rather widely differing heating techniques. Examples of such food items are those of the type including a crust portion having a filler portion lying over the crust portion, such as pizzas, open-faced pies, tacos, (before they are turned into the familiar roll form), and the like. In such cases, the crust portion requires a relatively low heat to avoid scorching and for a relatively prolonged time to impart the appealing and appetizing brown color and crunchy texture to the crust. On the other hand, the filler portion which can comprise many diverse foods and mixtures of foods such as cheeses, meat bits, peppers, eggs, small fish, fillings based on fruit fillings, etc., are not nearly as susceptible to scorching as a flaky crust and can be heated much more quickly and at higher temperatures as compared to the crust portion.

Especially in the so-called fast-food outlets where quick preparation and serving of a food item are highly desirable, diverse heating requirements of crust and filler portion can result in improperly prepared foods. The problems in heating food items of the type described are also accentuated when such items are heated from a frozen condition.

Prior ovens have not solved the problem encountered in heating food items having food portions of diverse heating requirements. U.S. Pat. No. 3,265,861 to Perlman discloses an electric oven for heating frozen foods in which the food is heated first by conduction to melt ice crystals and then heated by infrared rays to a higher temperature.

U.S. Pat. No. 3,626,155 to Joeckel discloses an electric oven for heating frozen foods in containers placed on plates having a thermal conductivity approximately equivalent to that of the food. The oven includes means for pulsing heat energy upward through the plate and container into the food at timed intervals, and pulsing infrared heat downwardly into the food at a predetermined wave length range while reflecting a portion of the infrared heat to produce an ambient condition. The air temperature within the oven is also regulated. This is said to produce a tolerable rate of temperature rise in the food by conduction, radiation, and convection.

U.S. Pat. No. 3,655,942 to Tosmic discloses the use of electrically energized heating tubes mounted in the upper and lower portions of an oven. A rack of open-mesh construction is positioned within the oven and intermediate the upper and lower tubes to support food items to be cooked.

SUMMARY OF THE INVENTION

A principal object of the present invention is to provide an oven adapted to heat a food item of the type having a crust portion and a filler portion in which all portions are properly heated. The present oven includes dual heating means, preferably electrically energized, which are designed to perform at different thermal intensities and for different periods of times. One heating means having the lesser thermal intensity and longer period of operation directs its heat energy toward the crust portion; while the other heating means having the greater thermal intensity but shorter period of operation directs its heat energy toward the filler portion.

In one form, the oven comprises inner and outer housings having thermal insulation therebetween, the inner housing defining a heating chamber. The housings have matching open sections defining a doorway and a thermally insulated door pivotally mounted with respect to the housings for opening and closing the doorway. Support means within the inner housing carries the food item having a lower crust portion and an upper filler portion. The first electrical heating means adapted for substantially constant heating operation at a predetermined temperature is mounted within the inner housing below the crust portion. The second heating means having a greater thermal intensity than the first heating means and adapted for substantially brief heating operation at a temperature higher than the predetermined temperature is also mounted within the inner housing but above the filler portion.

Optionally, the first heating means comprises a support means for the food item as well. Preferably, the heating means are both electrically energized, and the first heating means are both electrically energized, and the first heating means may also include a thermostatic electrical control to effect a desired predetermined temperature. The second electrical heating means may contain timer switch means to establish a predetermined period of operation for the second heating means.

DESCRIPTION OF THE PREFERRED EMBODIMENT

In general, the oven comprises a heating chamber containing a support for a food item which, as indicated, is of the type having a crust portion and a filler portion lying on the crust portion. Heating elements are placed below and above the support. That heating element located below the support, and therefore below the food item it carries, has a lower thermal intensity of the two heating elements and is adapted for substantially a constant heating operation at a predetermined temperature. That heating element located above the support, and therefore above the food item, has a higher thermal intensity of the two heating elements and is adapted for a substantially brief heating operation at a temperature higher than the predetermined temperature. Consequently, the two heating elements cooperate to provide a programmable heating cycle for the contents of the oven (e.g., food items), as discussed more fully hereinbelow. Along these lines, the skilled artisan will appreciate that, while the present invention is particularly adapted for the heating and/or cooking of food items comprised of crust and filler portions, the same may likewise be employed in a wide range of heating applications requiring such programmable heating cycles.

Figure 4:
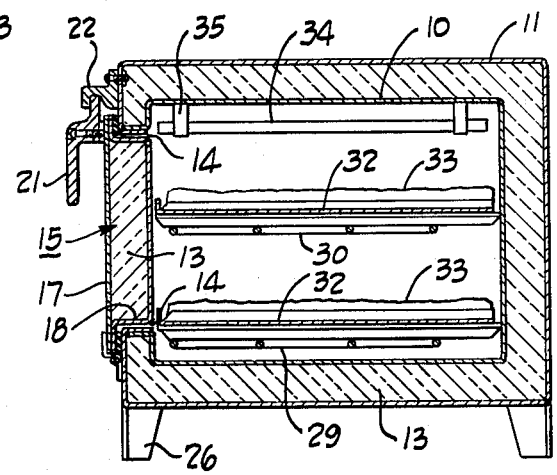

Referring to the drawings, the embodiment illustrated inlcudes an inner housing 10 and a larger outer housing 11 which are spaced from each other by standard thermal insulation 13. The housings are fabricated from metal such as stainless steel. Each housing is enclosed except for matched open sections defining a doorway 14 (FIG. 4). A door, generally represented at 15, is mounted by hinges 16 to outer housing 11 for pivoting between open and closed positions with respect to doorway 14; the door 15 pivoting in the plane of the drawing of FIG. 4. Door 15 includes a base metal sheet 17 to which inturned flanges 18 of a cover metal sheet 20 are suitably secured, as by spot welding. Conventional thermal insulation 13 fills the space formed between sheets 17 and 20.

Suitable lock means can be used to hold door 15 in a closed position in doorway 14. For example, (FIGS. 1, 2, and 4), a handle 21 is pivotally mounted on sheet 17 of the door and, upon pivoting in the plane of the drawing of FIG. 1, engages a recess in a latch 22 fixed to the top of the front of the outer housing 11 and in a camming action secures door 15 and housing 11 together. Outer housing 11 has an uninsulated side compartment 23 to house an electrical thermostat 24 and an electrical timer switch 25 as well as conventional circuitry therefor. Legs 26 mounted at each of the four corners of the oven support it in an elevated position.

Considering the interior of the oven, suitable support means carry one or more food items to be heated. While the heating means contemplated by the present oven can comprise any known means for such purpose, including gas-fired means, the preferred heating means is electrically energized, because such means can be more readily and easily controlled, both as to temperatures needed and times or periods of operation. Further, an electrical heating coil can also comprise the support means, and thereby eliminate an added structural feature otherwise needed for this purpose.

Figure 3:
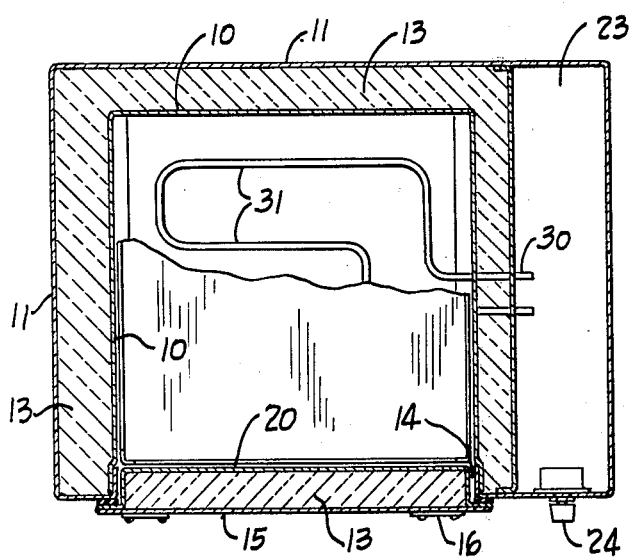
FIGS. 3 and 4 are sections of FIG. 1 on the planes of the lines 3—3 and 4—4, support members being removed in FIG. 3 to show a heating coil.

The embodiment illustrated by the drawings is designed for handling a charge of two food items. Each of two electrical heating coils 29 and 30, constituting first heating means for heating a crust portion, pass from side compartment 23 through adjacent walls of housings 10 and 11 (from which the coils are electrically insulated) and form a series of horizontally disposed coils or loops 31 (FIG. 3). Coil 29 occupies a position at the bottom of inner housing 10, while coil 30 occupies a position near the middle of the inner housing (FIG. 4). Each coil is an electrical resistance element designed to radiate heat upon passage of electric current therethrough, and is sufficiently rigid to support a conductive metal plate 32 which will itself support a food item, such as a prepared but uncooked pizza 33. In this manner, coils 29 and 30 lie beneath a crust portion which they are designed primarily to heat. Heating elements known in the art as calrods may be used for this purpose. Coils 29 and 30 are designed to generate heat at a relatively low temperature as compared to the second heating means hereinafter described. As an example, coils 29 and 30 may each generate heat up to about 500° F.

Figure 5:
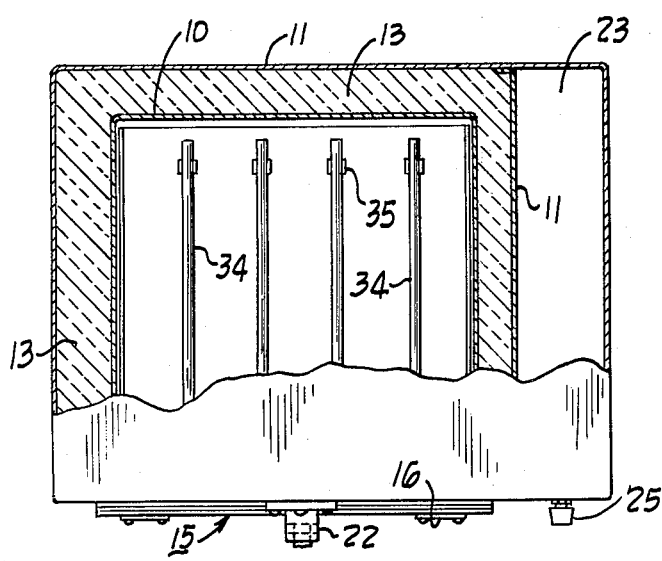
FIG. 5 is an offset section of FIG. 2 on the plane of the line 5—5.

A second electrical heating means is designed to heat the filler portion of a food item as it lies in contact with the crust portion, and therefore such heating means is placed above the food item. In the embodiment illustrated, four quartz lamps 34 extend in parallel across the top of the oven (FIG. 5) and are supported by clamps 35 adjacent each end. Lamps 34 are designed to generate heat at a relatively high temperature as compared to coils 29 and 30. As an example, each quartz lamp may generate heat up to about 1000° F.

There are two basic controls on the heating elements of the oven: a control on the temperature generated by coils 29 and 30, and a control on the time of operation of quartz lamps 34. Coils 29 and 30 have a substantially constant heating operation when the oven is in use; while lamps 34 have a substantially brief heating operation, and therefore are allowed to generate heat at a capacity for which they are naturally designed and constructed without normally placing any control on the heat radiated.

Figure 1:
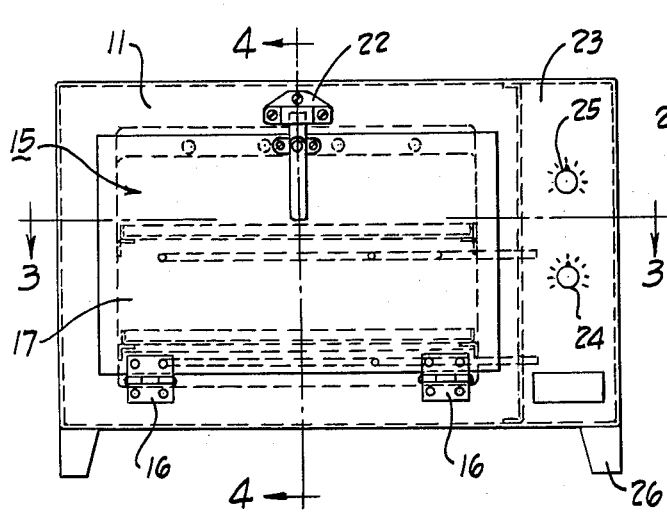
FIG. 1 is a front, elevational view of a present oven with certain interior parts shown by dotted lines.
Figure 2:
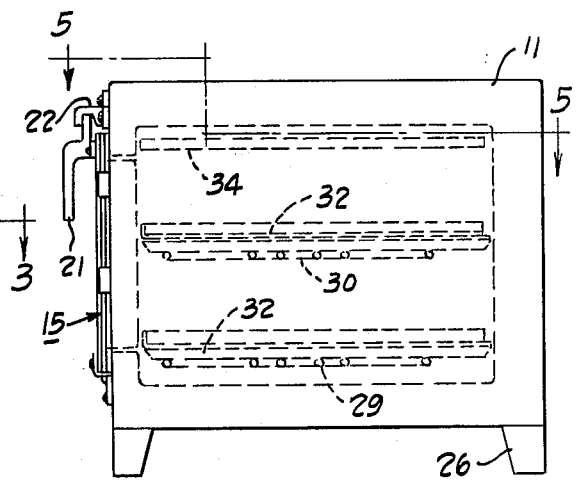
FIG. 2 is a right-hand side view of FIG. 1, also with certain interior parts shown by dotted lines.

In practice, the control on the temperatures generated by coils 29 and 30 is a thermostat 24, and the control on the time of operation of lamps 34 is a timer switch 25. Thermostat 24 and timer switch 25 are carried on the front panel of compartment 23 (FIG. 1). Compartment 23 contains the conductors of circuitry connecting coils 29 and 30 with thermostat 24 and to a source of power, as well as the conductors of circuitry connecting lamps 34 and timer switch 25 to a source of power. Both thermostat 24 and timer switch 25 are of standard construction known in the art. Thermostat 24 acts to vary the amperage through coils 29 and 30 and therefore the amount of heat they generate. Timer switch 25 is of the type which establishes a period of time before the switch closes to complete a circuit and then establishes a subsequent period of time before the switch is again thrown open.

Accordingly, in operation, coils 29 and 30 provide a relatively low but prolonged heat, while quartz lamps 34 provide a relatively high but quick heat. In one cooking procedure, thermostat 24 was adjusted such that coils 29 and 30 generated a temperature of about 500° F. When the interior of housing 10 was fairly uniform at this temperature, an uncooked pizza was placed upon a plate 32 resting on a heating coil 29 or 30, and timer switch 25 was set to close after about 1.5 minutes and to re-open after about 2 minutes. In the first 1.5 minutes, the underlying coil 29 or 30 heated the crust portion of the pizza at a relatively low temperature until it approached an attractive brown degree of doneness without scorching. Then quartz lamps 34 were energized and heated the filler portion of the pizza at about 4000° F. in a flash-heat cycle lasting for about 0.5 minute before timer switch 25 de-energized lamps 34, thereby making the operation substantially automatic. During the last half minute of baking, the filler portion of the pizza bubbled and was brought to a desired degree of doneness again without scorching either the filler or crust portions during this latter cycle. The food items charged to the present oven may be frozen or at room temperatures, adjustments being made in thermostat 24 and timer switch 25 to meet diverse requirements.

Although the foregoing describes a presently preferred embodiment of the present inventon, it is understood that the invention may be practiced in still other forms within the scope of the following claims.

I claim:

1. An oven for heating the upper portion of a food item under intense heat and for heating the lower portion of the food item with less intense heat, said oven comprising a housing having upper and lower portions;

quartz rod heating means positioned at the upper portion of said housing, and energizable to heat to a relatively high temperature;

heating coil means positioned below said quartz rod heating means;

support means for holding a food item between said quartz rod heating means and said heating coil means; thermostat means for controlling only the operation of said heating coil means, said thermostat means establishing a relatively low temperature in said heating coil means to heat the lower portion of the food item; and timing means for controlling only the operation of said quartz rod heating means, said timing means being actuable to energize said quartz rod heating means after a preselected time period after the establishment of the relatively low temperature to heat the upper portion of the food item and to de-energize said quartz rod heating means a preselected time period later.

2. The oven of claim 1 in which said relatively low temperature is about 500° F.

3. The oven of claim 1 in which said relatively high temperature is about 1000° F.

4. The oven of claim 1 in which said support means comprises a conductive metal plate.

* * * * *